March 24, 1936.   C. L. KNUTSON   2,035,389
WALLBOARD STRUCTURE AND FASTENER
Filed Nov. 3, 1933
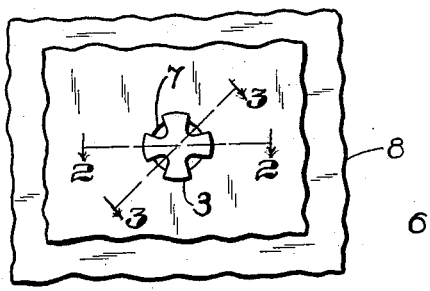
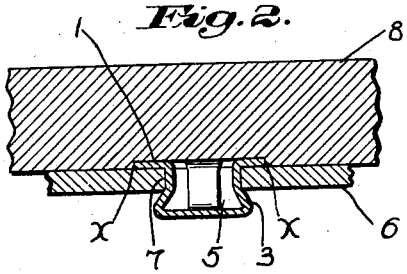
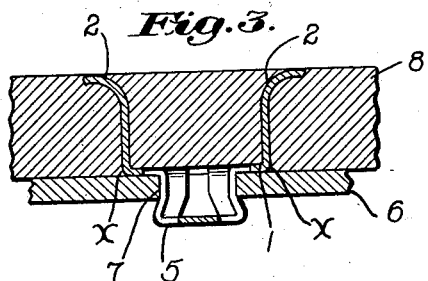
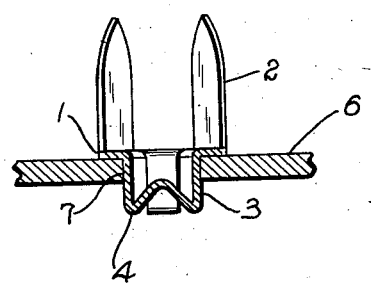
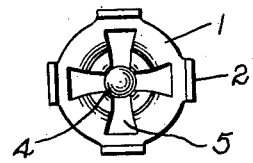
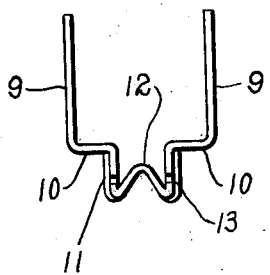
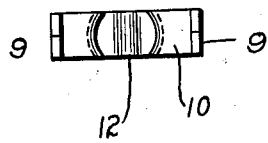
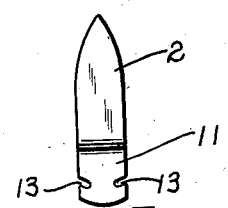
Inventor:
Carl L. Knutson
by Walter S. Jones Atty.

Patented Mar. 24, 1936

2,035,389

UNITED STATES PATENT OFFICE 2,035,389

WALLBOARD STRUCTURE AND FASTENER

Carl L. Knutson, Maywood, Ill., assignor to Cinch Manufacturing Corporation, Chicago, Ill., a corporation of Illinois Application November 3, 1933, Serial No. 696,517

7 Claims. (Cl. 72—118)

My invention aims to provide improvements in fasteners for securing wallboard and the like to a frame structure and also to the improved installation and the method of attachment.

In the drawing which illustrates preferred embodiments of my invention:—

Figure 1 is an elevational view of a portion of an installation secured by one of my improved fastener elements;

Fig. 2 is an enlarged section taken on the line 2—2 of Fig. 1;

Fig. 3 is an enlarged section taken on the line 3—3 of Fig. 1;

Fig. 4 is a section of a fastener and a sheet metal part prior to expansion of the shank of the fastener;

Fig. 5 is a side elevation of the fastener shown in Figs. 3 and 4;

Fig. 6 is a plan view of the fastener shown in Fig. 5;

Fig. 7 is a side elevation of a fastener of slightly different construction from that shown in Figs. 5 and 6;

Fig. 8 is a plan view of the fastener shown in Fig. 7; and

Fig. 9 is an edge view of the fastener shown in Fig. 7.

Referring to the embodiment of my invention illustrated by Figures 1 through 6, I have shown a fastener secured installation particularly, though not exclusively, adapted to be used in connection with building structures. One of the uses for which my improved fastener and installation are particularly adapted is in connection with the attachment of wall-board to the frame structure of a steel house. Heretofore a number of complicated constructions have been devised for attaching the wallboard to the steel frame structure. In contrast to those structures, mine is simple, durable and reduced to a minimum number of parts.

The first form of fastener illustrated by the annexed drawing is formed from a single piece of metal (Figs. 5 and 6) and has a base portion 1, a plurality of attaching prongs 2 extending at right angles from the periphery of the base portion 1 and a shank 3 extending from the center of the base portion. The shank 3 is substantially cup-shaped and has a hump 4 formed in the bottom thereof and normally extending toward the base 1 (Fig. 4) the purposes of which will be more fully hereinafter described. The shank 3 and a portion of the hump 4 is divided longitudinally by slots 5 which terminate in the base 1 to permit expansion of the shank 3.

The parts to be secured together by my improved fastener and variations thereof operating in the same manner to be hereinafter described include (Figs. 1, 2 and 3) a sheet metal member 6 having an aperture 7 formed therethrough and a juxtaposed member 8 which may be any one of a number of common types of fibrous wallboard now being used in the building trades.

The elements of my improved installation above described may be easily and quickly assembled in the following manner. First, the fastener is attached to the apertured sheet metal structure 6 by entering the shank 3 through the aperture 7 as illustrated in Fig. 4. Thereafter a suitable tool is inserted into the cup-shaped shank 3 and driven against the hump 4 to flatten it, thereby expanding that portion of the shank 3 which extends beyond the sheet metal member 6 so that the fastener may be rigidly secured in place, as illustrated in Figs. 2 and 3. It will be understood by those skilled in the art that this is a simple and efficient manner of attaching fasteners to a frame structure and any number of fasteners may be so attached prior to attachment of the wallboard 8. After the fastener members are properly located, an entire sheet of wallboard 8 may be easily and quickly attached by driving the wallboard over the projecting prongs 2, as shown in Fig. 4. During the attaching operation the prongs 2 pass through the wallboard 8 and when they reach the exposed surface are curled back into the material of the wallboard preferably as shown in Fig. 3. During the wallboard attaching operation a suitable mallet or other suitable implement may be used which is so constructed that when the sharp pointed ends of the prongs 2 contact with it they will be curled back into the wallboard material. If desirable, an implement providing an anvil may be placed against the outer face of the wallboard over a concealed fastener and the operator may strike the anvil plate one or more blows, thereby driving the prongs into the wallboard and curling them over by having them strike against the anvil plate during the pounding operation. This method of attaching the juxtaposed structural members firmly together is a simple and inexpensive one and furthermore is particularly desirable because it is unnecessary to use any aligning operation so far as the fastener members are concerned. Since the fasteners are put in place prior to attachment of the wallboard, that operation is a simple one and, since the prongs 2 may enter the wallboard at any point, it is only necessary to place the wallboard in the proper position and drive it into place.

The fastener shown in Figs. 7, 8 and 9 is shown to illustrate the fact that the principle of the fastener and the method of attaching the parts together is not limited to a fastener of a particular shape or structure. This fastener is formed from a narrow strip of metal and the ends are shaped to provide attaching prongs 9. The mid portion is shaped to provide shoulder portions 10—10 to rest against one face of the supporting structure 6. The mid portion is also shaped to provide a shank 11 having a hump portion 12 at one end thereof which acts in the same manner as the hump portion 4 in the fastener previously described. While it is not absolutely essential to do so, I provide the side portions, which make up the shank 11, with notches 13 adjacent to where the hump joins the shank, thereby to weaken the shank at that portion which is intended to extend beyond the inner face of the structure 6. Therefore, when the hump 12 is flattened the end of the shank is readily expanded to secure the fastener rigidly in position.

While I have illustrated and described preferred embodiments of my invention, I do not wish to be limited thereby, because the scope of my invention is best defined by the following claims:

I claim:

1. An installation of the class described including a pair of juxtaposed members to be secured together, one of said members having a preformed aperture therein, a fastening device for securing the said members together and having a portion entered into and secured in the aperture provided in one of said members, and attaching prongs extendings into and upset within the other member.

2. An installation of the class described including a pair of juxtaposed members to be secured together, one of said members having a preformed aperture therein, a fastening device for securing the said members together and having an expansible portion entered into the aperture provided in one of said portions and expanded to prevent separation from said member, and attaching prongs extending into and upset within the other member.

3. An installation of the class described including a metallic member having a preformed aperture therethrough, a fiberboard member superposed upon the metallic member, and a fastener member having a base portion located between the superposed members, an expansible portion extending through the aperture in the metallic member and expanded at the other side to prevent detachment of the fastener member therefrom, and a plurality of attaching prongs extending from said base into embedded relation with said fiberboard member, the ends of said prongs being upset within the fiberboard structure to hold the fiberboard structure firmly in position relative to the metallic member.

4. A fastener of the class described having a cup-shaped shank portion formed with an internally humped bottom adapted to be flattened to expand the shank portion for attaching the fastener to a supporting structure, a flange at the open end of the cup-shaped shank and a plurality of attaching prongs extending from said flange at points outside the periphery of the opening in said cup-shaped shank and in the opposite direction to said shank.

5. A one-piece fastener of the class described having means adapted to engage one face of a supporting structure, attaching prongs extending in one direction from the outer edge of said means and a shank extending from the central portion of said means in an opposite direction to that of the prongs and having a hump-shaped bottom adapted to be flattened to expand said shank.

6. A one-piece fastener of the class described formed from a narrow strip of sheet metal and having the ends thereof shaped to provide attaching prongs and the intermediate portion thereof shaped to provide a shank extending in an opposite direction to that of the prongs and having a hump adjacent to one end thereof adapted to expand the shank when flattened.

7. A one-piece fastener of the class described formed from a narrow strip of sheet metal and having the ends thereof shaped to provide attaching prongs and the intermediate portion thereof shaped to provide a shank extending in an opposite direction to that of the prongs and having a hump adjacent to one end thereof adapted to expand the shank when flattened and the sides of said shank having notches to weaken the shank adjacent to the hump thereby to permit easy expansion of the shank adjacent to the notches.

CARL L. KNUTSON.